United States Patent
Ward

(10) Patent No.: US 8,186,725 B2
(45) Date of Patent: *May 29, 2012

(54) APPARATUS AND METHOD FOR SUPPORTING A PIPE COUPLING

(75) Inventor: Martin G. Ward, Lakewood, CO (US)

(73) Assignee: Onset Pipe Products, Inc., Lakewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/833,190

(22) Filed: Jul. 9, 2010

(65) Prior Publication Data

US 2010/0270790 A1    Oct. 28, 2010

Related U.S. Application Data

(63) Continuation of application No. 12/105,074, filed on Apr. 17, 2008, now Pat. No. 7,770,941.

(51) Int. Cl.
  *F16L 21/00* (2006.01)
(52) U.S. Cl. ............ 285/419; 285/45; 285/236; 285/114
(58) Field of Classification Search .................. 285/419, 285/45, 236, 237, 114
  See application file for complete search history.

(56) References Cited

U.S. PATENT DOCUMENTS

| | | | |
|---|---|---|---|
| 232,432 A | 9/1880 | Allison | |
| D32,498 S | 4/1900 | Watson | |
| 2,068,648 A | 1/1937 | Kaplan | |
| 2,288,904 A | 6/1942 | Hudson | |
| 2,784,989 A | 3/1957 | Krupp | |
| 2,904,356 A | 9/1959 | Love | |
| 2,980,143 A | 4/1961 | Harris | |
| 3,030,601 A * | 4/1962 | Krebs | 285/45 |
| 3,153,550 A | 10/1964 | Hollett | |
| 3,165,324 A | 1/1965 | Zopfi | |
| 3,206,229 A | 9/1965 | Kramer | |
| 3,211,475 A | 10/1965 | Freed et al. | |
| 3,394,952 A | 7/1968 | Garrett | |
| 3,479,066 A * | 11/1969 | Gittleman | 285/236 |
| 3,527,484 A * | 9/1970 | Walkden | 285/236 |
| 3,539,206 A | 11/1970 | Daniels et al. | |
| 3,572,773 A | 3/1971 | Read | |

(Continued)

FOREIGN PATENT DOCUMENTS

EP    44719 A1    1/1982

OTHER PUBLICATIONS

Mission Rubber Company, "If we put our name on it—you can depend on It!" Product Catalog, Jun. 6, 24 pages.

(Continued)

*Primary Examiner* — David E Bochna
(74) *Attorney, Agent, or Firm* — Merchant & Gould, P.C.

(57) ABSTRACT

A pipe coupling support having a substantially rigid body with an inner surface formed to mate with at least a portion of the exterior surface of a pipe coupling installed on pipe. In many cases, the exterior surface of the installed pipe coupling will be non-cylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

10 Claims, 6 Drawing Sheets

U.S. PATENT DOCUMENTS

| | | | |
|---|---|---|---|
| 3,574,354 A | | 4/1971 | Mischel |
| 3,586,354 A | * | 6/1971 | Boscacci .................. 285/420 |
| 3,692,337 A | | 9/1972 | Mischel |
| 3,743,329 A | | 7/1973 | Wesel |
| 3,837,685 A | | 9/1974 | Miller |
| 3,851,901 A | * | 12/1974 | Sills ........................... 285/236 |
| 4,036,513 A | | 7/1977 | Loftus et al. |
| 4,172,607 A | | 10/1979 | Norton |
| 4,186,948 A | * | 2/1980 | Cronk ......................... 285/236 |
| 4,221,407 A | * | 9/1980 | Steimle ....................... 285/236 |
| 4,282,743 A | * | 8/1981 | Pickett ............................. 73/46 |
| 4,336,959 A | | 6/1982 | Roche |
| 4,340,052 A | * | 7/1982 | Dennehey et al. .......... 604/317 |
| 4,360,227 A | | 11/1982 | Bridges |
| 4,380,348 A | | 4/1983 | Swartz |
| 4,417,755 A | | 11/1983 | Gittleman |
| 4,480,860 A | * | 11/1984 | Foresta et al. ................ 285/236 |
| 4,518,177 A | * | 5/1985 | Deakins ....................... 285/373 |
| 4,538,837 A | * | 9/1985 | Cronk ......................... 285/236 |
| 4,587,994 A | | 5/1986 | Links et al. |
| 4,611,835 A | | 9/1986 | Gittleman |
| 4,643,465 A | * | 2/1987 | Green et al. ................ 285/236 |
| 4,667,505 A | | 5/1987 | Sharp |
| 4,726,611 A | | 2/1988 | Sauer |
| 4,728,130 A | * | 3/1988 | Corzine ...................... 285/351 |
| 4,741,559 A | * | 5/1988 | Berghman .................... 285/45 |
| 4,763,695 A | | 8/1988 | Dooley |
| 4,804,209 A | | 2/1989 | Fischer |
| 4,929,236 A | | 5/1990 | Sampson |
| 4,939,923 A | | 7/1990 | Sharp |
| D309,774 S | | 8/1990 | Lewis |
| 4,966,397 A | | 10/1990 | McKinnon |
| 5,002,314 A | * | 3/1991 | Smith ............................ 285/45 |
| D318,321 S | | 7/1991 | Wigle |
| 5,039,137 A | * | 8/1991 | Cankovic et al. ............ 285/236 |
| 5,056,833 A | * | 10/1991 | Webb et al. .................. 285/373 |
| 5,070,597 A | | 12/1991 | Holt et al. |
| 5,190,322 A | * | 3/1993 | Hughes ........................ 285/236 |
| 5,193,859 A | | 3/1993 | McKinnon |
| 5,203,594 A | * | 4/1993 | Straub ......................... 285/373 |
| 5,370,427 A | | 12/1994 | Hoelle et al. |
| 5,398,976 A | * | 3/1995 | Webb ........................... 285/236 |
| 5,430,252 A | | 7/1995 | Petersen |
| 5,480,193 A | * | 1/1996 | Echols et al. .................. 285/45 |
| 5,531,695 A | * | 7/1996 | Swisher ......................... 285/45 |
| 5,564,463 A | * | 10/1996 | Helmsderfer .................. 285/47 |
| D383,053 S | | 9/1997 | Shrader et al. |
| D383,378 S | | 9/1997 | Schrader et al. |
| 5,853,200 A | * | 12/1998 | Zieres ............................ 285/45 |
| 5,901,739 A | * | 5/1999 | Helmsderfer .................. 285/47 |
| D439,637 S | | 3/2001 | Davies |
| D454,941 S | | 3/2002 | Dietzel |
| D468,002 S | | 12/2002 | Steffan |
| D473,935 S | | 4/2003 | Braun |
| 6,561,552 B1 | | 5/2003 | Berg |
| D486,891 S | | 2/2004 | Cronce |
| 7,066,497 B2 | | 6/2006 | Fullbeck et al. |
| 7,249,787 B1 | | 7/2007 | Chisnell |
| 7,770,941 B2 | * | 8/2010 | Ward ............................ 285/419 |
| 7,887,097 B2 | * | 2/2011 | Blivet ............................. 285/45 |
| 2003/0184083 A1 | * | 10/2003 | Linam et al. .................... 285/45 |
| 2004/0130148 A1 | | 7/2004 | Patterson et al. |
| 2005/0099005 A1 | | 5/2005 | Fullbeck et al. |
| 2005/0161941 A1 | | 7/2005 | Poll et al. |
| 2007/0222212 A1 | | 9/2007 | Chisnell |
| 2007/0257488 A1 | * | 11/2007 | Jimenez ........................ 285/404 |
| 2007/0284037 A1 | | 12/2007 | Buytaert |
| 2009/0261585 A1 | | 10/2009 | Ward |
| 2010/0320757 A1 | | 12/2010 | Ward |

OTHER PUBLICATIONS

International Search Report and Written Opinion for Application No. PCT/US2009/040837 dated Jun. 16, 2009.

IAPMO R&T, Product Listing Directory, http://pld.iapmo.org/, 1 page.

IAPMO Research and Testing, Inc., Certificate of Listing, Aug 2009, 2 pages.

USPTO Notice of Allowance dated Apr. 1, 2010, cited in U.S. Appl. No. 12/105,074; 7 pages.

USPTO Non-Final Office Action dated Sep. 18, 2009, cited in U.S. Appl. No. 12/105,074; 12 pages.

Amendment and Response to Non-Final Office Action dated Sep. 18, 2009, cited in U.S. Appl. No. 12/105,074 filed Jan. 19, 2010; 11 pages.

USPTO Notice of Allowance dated Nov. 16, 2009, cited in U.S. Appl. No. 29/335,576; 9 pgs.

U.S. Appl. No. 12/425,641, Office Action mailed Sep. 29, 2011, 11 pages.

U.S. Appl. No. 12/853,117, Office Action mailed Dec. 12, 2011, 8 pgs.

U.S. Appl. No. 12/425,641, Amendment and Response filed Dec. 29, 2011, 12 pages.

U.S. Appl. No. 12/425,641, filed Apr. 17, 2009, Office Action mailed Mar. 29, 2011, 12 pages.

Amendment and Response to Non-Final Office Action dated Sep. 24, 2010, cited in U.S. Appl. No. 12/833,190, filed Dec. 27, 2010; 13 pages.

U.S. Appl. No. 12/425,641, filed Apr. 17, 2009, Amendment and Response to non-final Office Action mailed Mar. 29, 2011, dated Jun. 29, 2011, 13 pages.

* cited by examiner

APPARATUS AND METHOD FOR SUPPORTING A PIPE COUPLING

CROSS-REFERENCE TO RELATED CASES

This utility patent application is a continuation of U.S. patent application Ser. No. 12/105,074 filed on Apr. 17, 2008 now U.S. Pat. No. 7,770,941, entitled "APPARATUS AND METHOD FOR SUPPORTING A PIPE COUPLING", which is hereby incorporated by reference.

TECHNICAL FIELD

An apparatus and method for supporting or reinforcing a pipe coupling installed on pipe.

BACKGROUND

Pipe couplings are often used to couple or join the ends of two lengths of pipe together. Many modern pipe couplings are cylindrical or tubular devices formed of a pliable material such as natural or synthetic rubber. The free ends of the pipes to be coupled are fit into respective sides of the pipe coupling, and generally, one of many types of pipe or hose clamp is used to compress the coupling to the exterior surface of the pipes being joined. Pipe couplings thus serve at least two purposes. The coupling both joins the free ends of two or more pipes together and seals the joint against leakage.

The drain and waste system of most modern construction is fabricated from PVC or CPVC pipe having various suitable diameters. Generally, the interior drain and waste lines will be joined to one or more larger waste lines which passes from the interior to the exterior of the building.

In contrast to the interior drain and waste lines, exterior waste pipes and sewer lines are generally fabricated from clay, cast iron, formed concrete or other non-plastic materials. The pipes used in exterior waste lines often have a somewhat different outside diameter from the waste lines exiting a building. A special pipe coupling may be used to join together two pipes having differing outside diameters or fabricated from different materials.

Element 10 of FIG. 2 is a typical pipe coupling which may be installed between the waste pipe exiting a building and the feeder pipe to an external sewer line. Prior art couplings typically have a flexible or pliable body which is sized to receive the dissimilar pipes at opposite ends. In addition, one or more pipe clamps may be associated with the body to secure and seal the coupling to the respective pipes. Since a typical prior art coupling has a flexible or pliable body the pipe ends can move with respect to each other or separate from each other in response to tension or shear forces which are typically present when the ground around the pipes subsides, a building settles or other forces are applied to the system. Relatively small lateral displacement between the respective pipe ends can cause a failure of the seal and furthermore can cause a pipe edge to be projected into the flow pathway which facilitates blockage at the joint. The inability of a typical flexible coupling to adequately support the joint between waste and sewer pipes or to effectively resist shear and tension forces placed on the pipes is the primary cause of the failure of this joint. Accordingly, a commonplace but expensive repair which is often necessary on the joint between interior waste lines and the exterior sewer system involves excavation of the failed joint, repositioning of the pipes and replacement of the coupling.

Certain types of reinforced couplings are known which may reduce, but typically will not eliminate the problems described above. For example, couplings with a stainless steel support sleeve associated with the pipe clamps are available. Known reinforced designs do not, however, typically provide adequate support to resist the large shear and tension forces applied to pipes when a building or the ground around the joint settles.

Plumbing and sewage contractors may also encase the entire joint in a quantity of concrete. This effectively stabilizes the joint; however, this solution is expensive and renders the joint between the pipes no longer accessible for service needs.

The present invention is directed toward overcoming one or more of the problems discussed above.

SUMMARY OF THE EMBODIMENTS

One embodiment is a pipe coupling support having a substantially rigid body with an inner surface formed to mate with at least a portion of the exterior surface of a pipe coupling installed on pipe. In many cases, the exterior surface of the installed pipe coupling will be noncylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

The pipe coupling support may feature at least one recess in the body which is configured to receive a clamp or other structure associated with the installed pipe coupling. By effectively accommodating pipe clamp bolts or other structures in the recess, the pipe coupling support may otherwise more closely mate with the exterior surface of the installed pipe coupling. The support may also include apparatus for compressing or tightening the body into close engagement with the installed pipe coupling. This apparatus can include but is not limited to one or more pipe or hose clamps, bolts, screws, or other threaded members associated with the pipe coupling support body. The pipe coupling support may also include one or more inner supports associated with the inner surface of the body to closely mate with and further support the exterior surface of the installed pipe coupling or the pipe itself adjacent to the coupling.

Another embodiment is a pipe coupling having a substantially rigid body with an inner surface as described above. This embodiment may also include a support sleeve which is configured to fit between the rigid body and the exterior surface of a pipe coupling installed on pipe. In this embodiment, the support sleeve itself may define at least one recess configured to receive a clamp structure such as a tightening bolt associated with the installed pipe coupling. In installations where the exterior surface of the installed pipe coupling is non-cylindrical, the exterior surface of the support sleeve and a portion of the pipe coupling may define a substantially cylindrical surface when the support sleeve is operatively associated with the installed pipe coupling. The support sleeve may be rigid or pliable.

Another embodiment is a pipe coupling having a substantially rigid body and a pliable inner member. The pliable inner member may include a first cylindrical inner surface sized to mate with the outer surface of a first pipe having a first outside diameter. The pliable inner member may also have a second cylindrical inner surface sized to mate with the outer surface of a second pipe having a second outside diameter, which is less than the diameter of the first pipe. The pliable inner member may also have a junction surface between the first and second cylindrical surfaces which is substantially perpendicular to both the first and second cylindrical inner surfaces. This embodiment may also include apparatus such as one or more pipe clamps or bolts associated with the body for compressing or tightening the body and inner member into close engagement with the free ends of first and second pipes. When operatively installed the pipe coupling and inner member are configured such that the junction surface abuts the free end of the first pipe.

Another embodiment is a method of supporting a pipe coupling installed on pipe. The method includes providing a pipe coupling support of any type as described above and associating the pipe coupling support with an installed pipe coupling such that the inner surface of the support body is closely engaged with the exterior surface of the installed pipe coupling.

The method may also include compressing or tightening the pipe coupling support into close engagement with the installed pipe coupling. Compression may occur with pipe clamps, bolts associated with the body, or other tightening means. The method may also include receiving clamp structures such as bolts which are associated with the installed pipe coupling into recesses associated with the pipe coupling support to maximize the engagement area between the pipe coupling support and installed pipe coupling.

DETAILED DESCRIPTION

Figure 1:
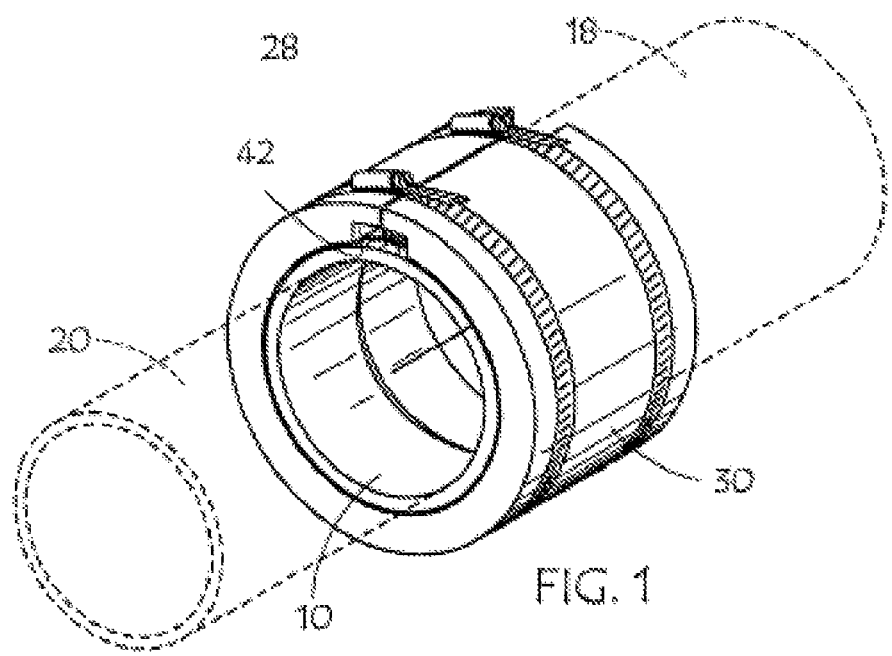
FIG. 1 is a perspective view of a pipe coupling support.
Figure 2:
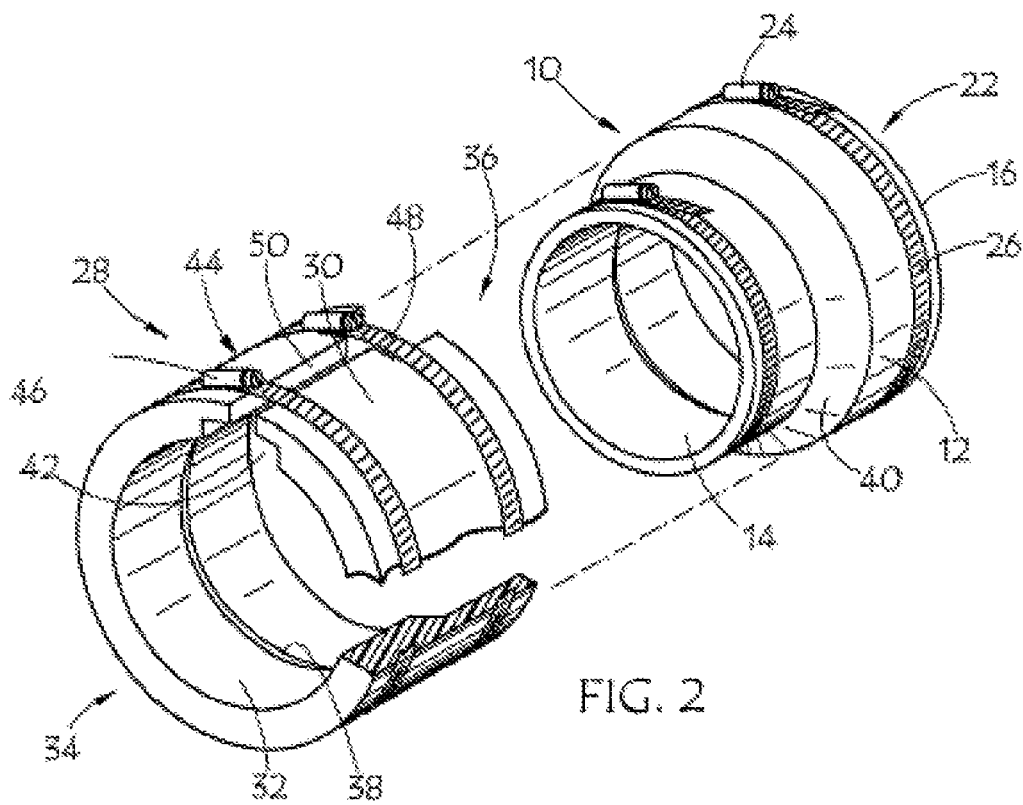
FIG. 2 is an exploded perspective view of the pipe coupling support of FIG. 1

Various embodiments of pipe coupling supports are disclosed herein which may be used to support and reinforce an existing, new or previously installed pipe coupling. A typical pipe coupling 10 is illustrated in FIG. 1 and FIG. 2. The pipe coupling 10 includes a sleeve 12 which is typically molded from a pliable substance such as natural or synthetic rubber. The sleeve 12 has a first opening 14 and a second opening 16 at opposite ends. The first and second openings are appropriately sized to receive the free ends of the pipes which are to be joined with the coupling 10. As is best shown in FIG. 2, the first opening 14 and second opening 16 may define openings of different diameter. Thus, the first opening 14 and second opening 16 may be formed to receive and seal with a first pipe 18 and second pipe 20 (see phantom outline FIG. 1) which have different diameters and may also be fabricated from different materials.

The pipe coupling 10 as described above is therefore suitable for joining and sealing the typically plastic pipe which passes to the exterior of a building from the building's drain and waste system with an exterior pipe connected to a sewer or septic system. The sewer or septic system pipe is often fabricated from a non-plastic material such as clay, cast iron or concrete.

The pipe coupling 10 also has one or more pipe clamps 22 associated with the sleeve 12. The pipe clamp 22 as shown in FIG. 2 includes a worm drive bolt 24 engaged with a typically stainless steel strap 26 such that rotation of the worm drive bolt 24 causes compression of the first or second opening 14, 16 respectively. Thus, the pipe clamp 22 may be used to assure that the coupling 10 is securely bound to and sealed with pipes 18 and 20.

The sleeve 12 is typically fabricated from a pliable material such as natural or synthetic rubber. Thus, the sleeve itself provides only moderate resistance to lateral displacement of the pipe ends as a result of shear forces which might result when the associated building or backfill settles. Similarly, the pliable sleeve 12 provides only moderate resistance to linear displacement of the free ends of the pipes 18 and 20 upon the application of tension forces such as might occur when backfill subsides along a length of pipe. Accordingly, the pipe coupling 10 provides only moderate protection against failure of the joint upon the application or force or stress to either pipe 18 or pipe 20.

One embodiment of a pipe coupling support 28 is illustrated in FIG. 1 and FIG. 2. This embodiment of a pipe coupling support 28 includes a substantially rigid body 30 which has an inner surface 32 which is formed to mate as closely as possible with the exterior surface of a pipe coupling 10 installed on pipe. The pipe coupling support body 30 may be fabricated from plastic, metal, concrete, a ceramic material or other substance having suitable rigidity to support an installed pipe coupling 10.

Many typical pipe couplings 10 have a non-cylindrical external profile since the sleeve 12 has a substantially uniform thickness throughout the coupling 10 but the first and second openings 14, 16 are of different sizes to accommodate dissimilar pipes. As shown in FIG. 2, the inner surface 32 of the rigid body 30 of a pipe coupling support 28 may be formed to mate with a majority of or substantially the entire exterior surface of the installed pipe coupling 10. Thus, the inner surface 32 may have a relatively smaller opening 34 and a relatively larger opening 36 at opposite ends of the body 30 to correspond with the differentially sized first and second openings 14, 16. In addition, the transition 38 between the smaller opening 34 and large opening 36 of the body 30 may be sloped at an appropriate angle or otherwise formed to closely mate with the sloped portion 40 of the sleeve 12 between the respective openings.

Close engagement of the pipe coupling support 28 with the coupling 10 may be further enhanced by providing the body 30 with one or more recesses 42 defined by the body 30 and positioned to receive protruding structures such as the worm drive 24 of the coupling 10. The operative configuration of a recess 42 receiving a worm drive 24 is best shown in FIG. 1.

As shown in FIG. 1 and FIG. 2, this embodiment of the pipe coupling support 28 may include an apparatus for compressing or tightening the body 30 into close engagement with the installed pipe coupling 10. This apparatus may (as is shown in FIGS. 1 and 2) be one or more conventional pipe clamps operatively associated with the substantially rigid body 30.

The pipe clamps 44 may include a worm drive 46 and strap 48 such that tightening the bolt associated with the worm drive 46 causes the strap 48 to compress the body 30. Compression may occur at slot 50. Alternatively, another type of compression zone or a pliable portion may be added to the body 30 to facilitate radial compression.

Figure 3:
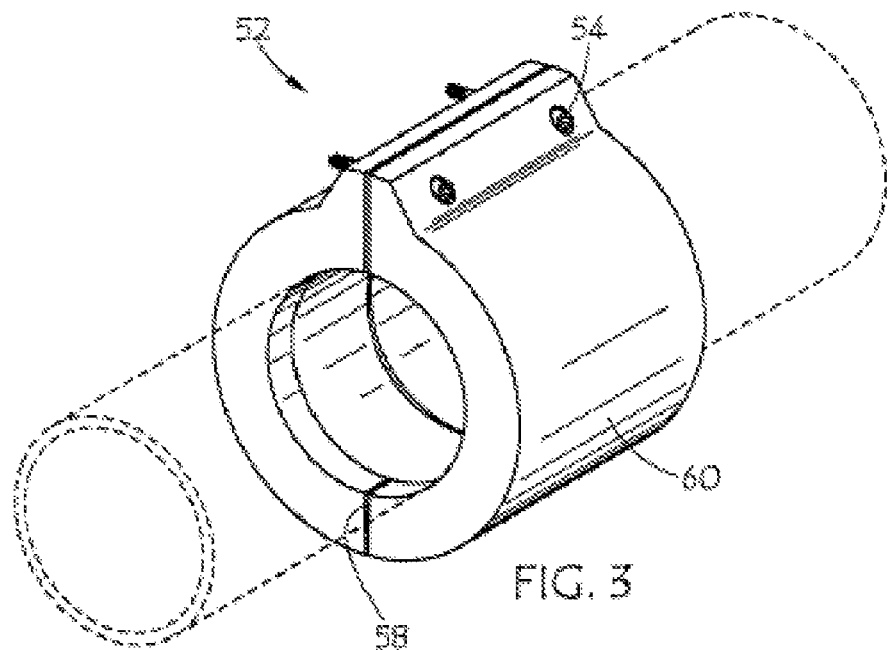
FIG. 3 is a perspective view of an alternative embodiment of a pipe coupling support.
Figure 4:
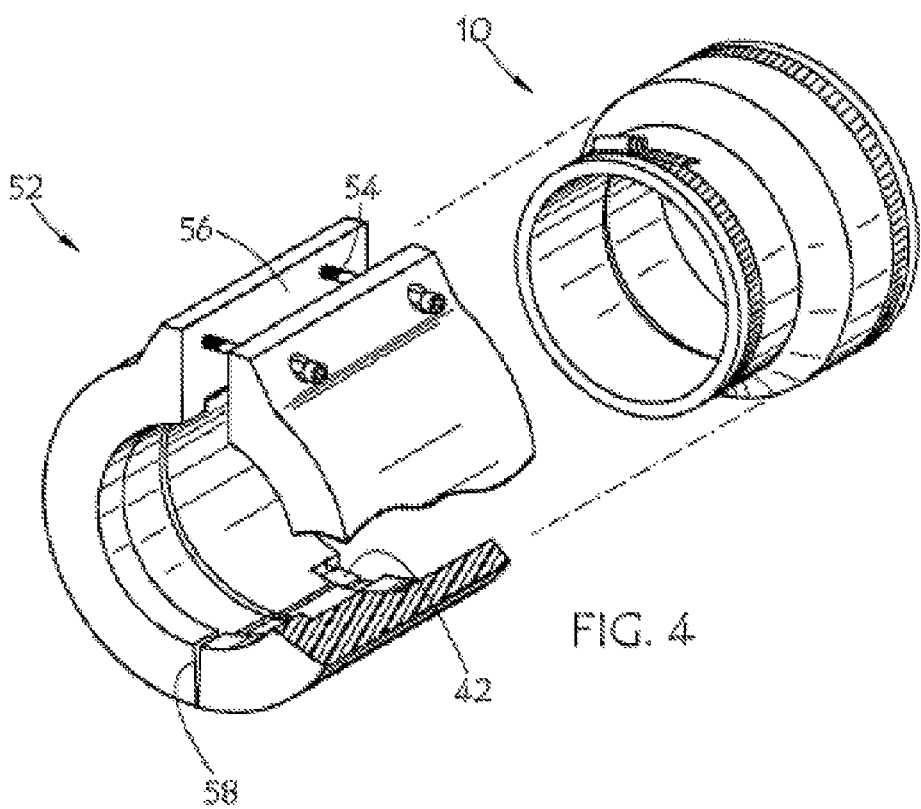
FIG. 4 is an exploded perspective view of the pipe coupling support of FIG. 3.

Other types of apparatus may be used to assure that the pipe coupling support may be compressed or tightened into close engagement with the installed pipe coupling 10. For example, as is illustrated in FIGS. 3 and 4 an alternatively configured pipe coupling support 52 which is otherwise structurally similar to the embodiment described above may be tightened into close engagement with an installed pipe coupling 10 with one or more threaded bolts 54 associated with a slot 56. The pipe coupling support 52 of FIGS. 3 and 4 also features a hinge 58 which may be a supplemental structure or living hinge molded into the body 60. The hinge facilitates the wide opening of the pipe coupling support 52 for placement over a pipe coupling 10.

Figure 5:
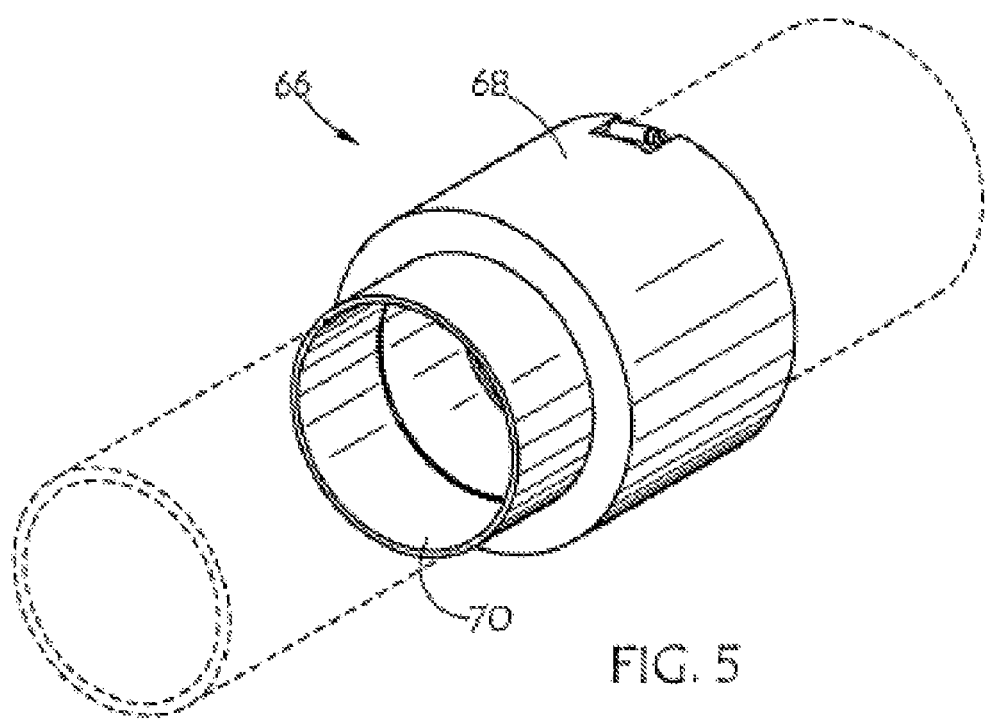
FIG. 5 is a perspective view of a pipe coupling support without compression apparatus.
Figure 6:
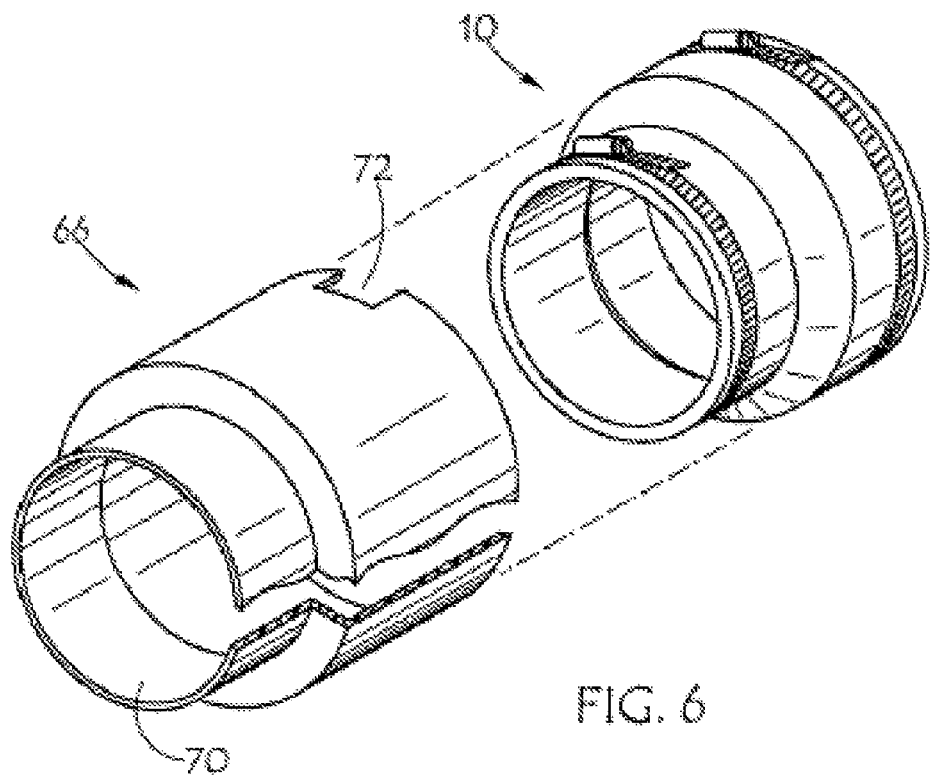
FIG. 6 is an exploded perspective view of the pipe coupling support of FIG. 5.

Separate apparatus for tightening the body 60 into close engagement with the installed pipe coupling 10 may not, in certain instances, be desired or necessary. For example, an alternative pipe coupling support 66 as illustrated in FIGS. 5 and 6 may include a body 68 which has an inner surface 70 and one or more recesses 72 configured to slide into close mating engagement with an installed pipe coupling 10.

Figure 7:
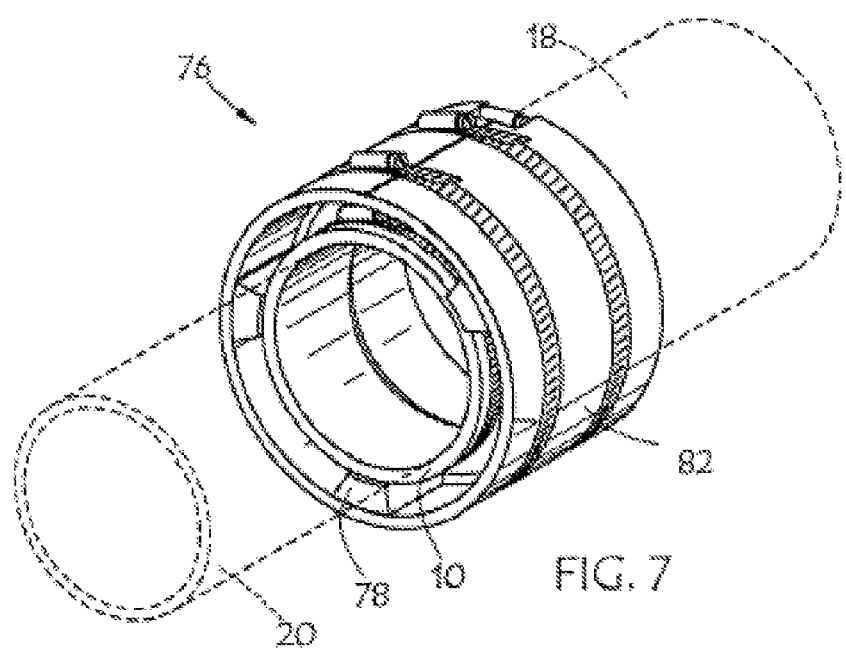
FIG. 7 is a perspective view of a pipe coupling support including inner supports.
Figure 8:
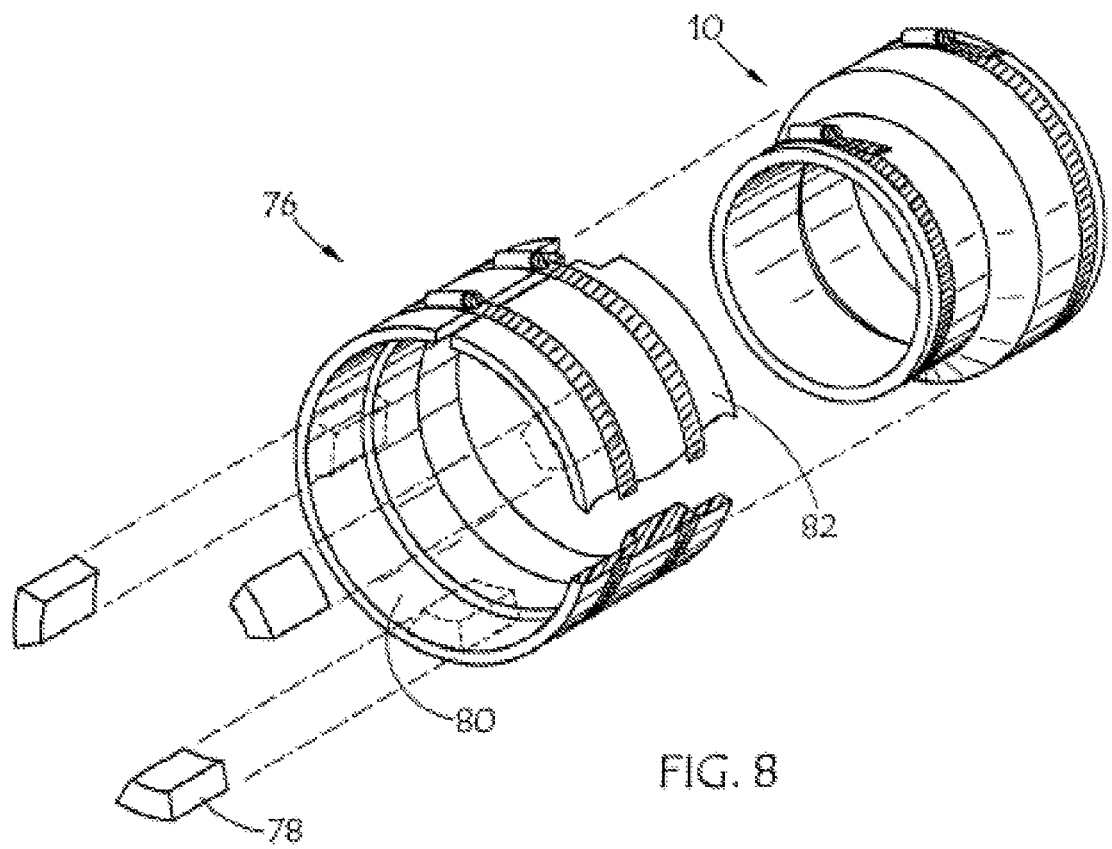
FIG. 8 is an exploded perspective view of the pipe coupling support of FIG. 7.

A pipe coupling support 76 as shown in FIGS. 7 and 8 may be fabricated with one or more inner supports 78 operatively positioned between the inner surface 80 of the body 82 and a portion of the exterior surface of an installed pipe coupling 10. Thus, the inner support 78 may provide additional support and minimize the need to fabricate a body with a variable inner profile. Alternatively, the body 82 of the pipe coupling support 76 could be sized to extend beyond the ends of the pipe coupling 10 and one or several inner supports 78 could mate and support directly with a first or second pipe 18, 20. The inner supports 78 can be of any shape and fabricated from a pliable or rigid material. The inner supports 78 may be separate structures or formed as extensions of the body 82.

Figure 9:
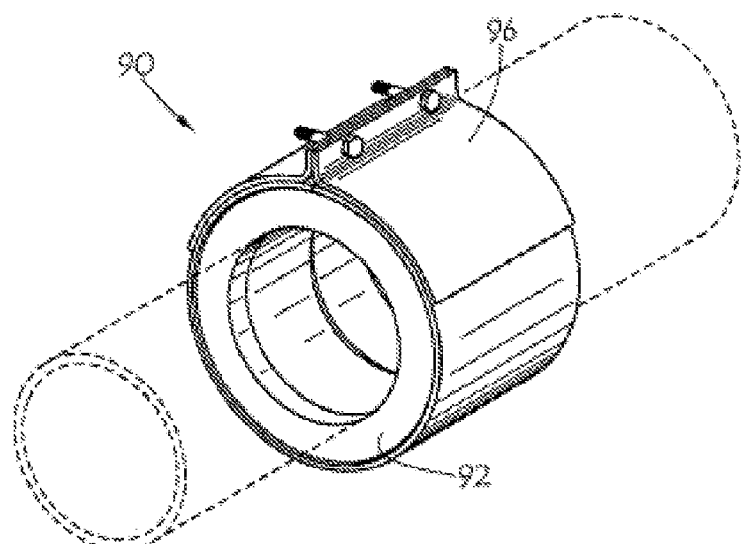
FIG. 9 is a perspective view of a pipe coupling support including a support sleeve.
Figure 10:
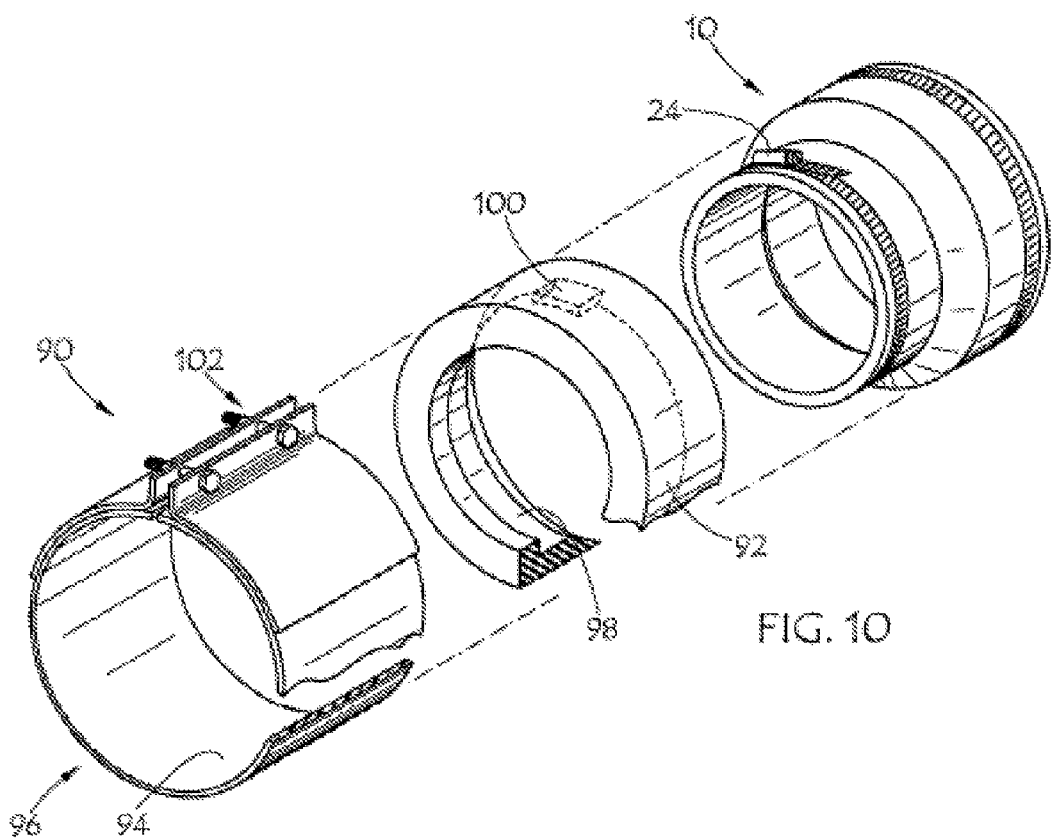
FIG. 10 is an exploded perspective view of the pipe coupling support of FIG. 9.

In each of the embodiments described above, the substantially rigid body of the pipe coupling support either directly, or in association with inner supports, is closely engaged with the pipe coupling 10 when the pipe coupling support is positioned for use. In an embodiment of a pipe coupling support 90 as shown in FIGS. 9 and 10 a support sleeve 92 may be operatively positioned between an inner surface 94 of the substantially rigid body 96 and an installed pipe coupling 10. The support sleeve 92 may have an inner support surface 98 which is formed to mate with an exterior surface of the pipe coupling 10. The support sleeve may also define one or more recesses 100 configured to receive worm drive 24 or other structure associated with the pipe coupling 10.

The body 96 of this embodiment of the pipe coupling support 90 may include an apparatus for compressing or tightening the body and support sleeve into close engagement with the pipe coupling 10. This apparatus may be a pipe clamp as described above, a bolt and slot apparatus 102 as shown on FIGS. 9 and 10, or another apparatus suitable for radially compressing the body 96.

As described above, a typical pipe coupling 10 for joining dissimilar pipes will not have a straight walled cylindrical external profile. Accordingly, many embodiments of a pipe coupling support as described herein feature an inner surface specifically formed to mate with the irregular exterior surface of the pipe coupling. As shown in FIGS. 9 and 10, the support sleeve 92 may be sized such that the exterior surface of the support sleeve and a portion of the exterior surface of the installed pipe coupling 10 form a substantially straight walled cylindrical combined surface when the support sleeve 92 is operatively associated with the installed pipe coupling. Thus, the inner surface of the body 96 may be fabricated with substantially straight cylindrical sides. This configuration facilitates fabrication of the body 96 from rolled sheet stock or readily available rigid pipe sections and in certain instances may eliminate molding or machining steps which might be necessary with other embodiments to ensure that the inner surface of the body closely mates with the exterior surface of a pipe coupling.

Figure 11:
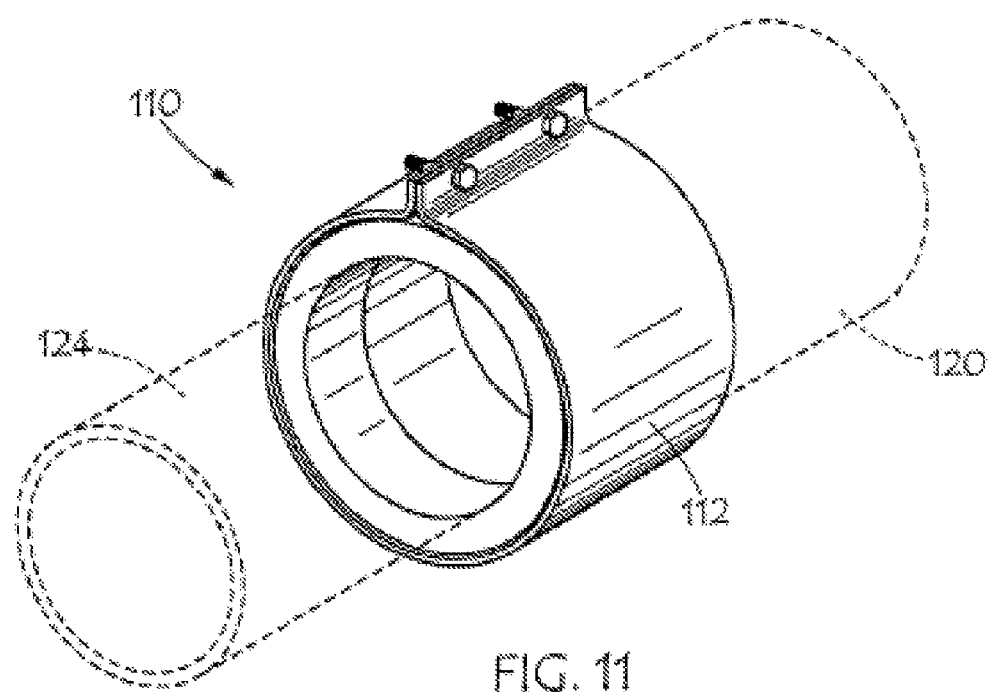
FIG. 11 is a perspective view of a pipe coupling having a pliable inner member with a junction surface.
Figure 12:
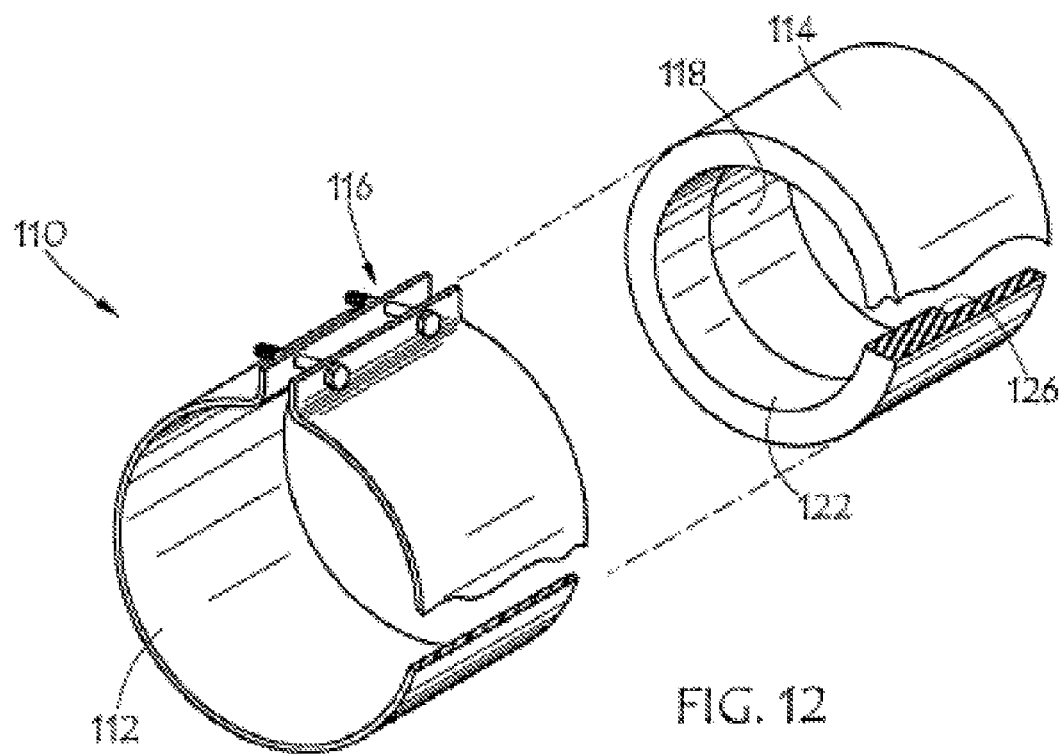
FIG. 12 is an exploded perspective view of the pipe coupling of FIG. 11.

FIGS. 11 and 12 illustrate a novel pipe coupling 110. The pipe coupling 110 includes a substantially rigid body 112 and a pliable inner member 114. The body 112 may optionally include compression apparatus such as one or more pipe clamps or the bolt, slot and flange apparatus 116 illustrated in FIGS. 11 and 12. The coupling 110 could alternatively be implemented with other types of compression apparatus or no compression apparatus at all.

The pliable inner member 114 includes a first cylindrical inner surface 118 sized to mate with the outer surface of a first pipe 120 having a first diameter. The pliable inner member 114 also has a second cylindrical inner surface 122 sized to mate with an outer surface of a second pipe 124 having a second diameter which is less than the diameter of the first pipe 120.

A junction surface 126 is the transition between the first cylindrical inner surface 118 and the second cylindrical inner surface 122. The junction surface 126 is substantially perpendicular to both the first and second cylindrical inner surfaces. Thus, when the coupling 110 is placed into engagement with a free end of the first pipe 120 the free end closely abuts the junction surface assuming the free end of the first pipe 120 is cut in a reasonably square manner.

The pipe coupling support embodiments of FIG. 110 described in detail above may be used to provide support and structural rigidity to a new or previously installed pipe coupling. The pipe coupling support may be placed or slid over the existing pipe coupling while making sure that protruding apparatus associated with the coupling such as the worm drive 24 of FIG. 2 are received in the appropriate recesses 42 associated with the pipe coupling support. When properly placed into position, any compression apparatus associated with the pipe coupling support may be tightened assuring close operative engagement between the pipe coupling support and the underlying pipe coupling.

The pipe coupling support may be installed over a pipe coupling immediately after the pipe coupling is installed to join pipe sections. Alternatively, a pipe coupling support may be installed over an existing pipe coupling to repair or reinforce the joint. The substantially rigid body of the various pipe coupling support embodiments described herein greatly increases the ability of a pipe joint joined with a conventional pipe coupling to resist shear forces or tension forces as are commonly encountered when settling occurs.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A pipe coupling support for supporting an installed pipe coupling, the pipe coupling support comprising:
    a continuous body formed by a roughly cylindrically-shaped sheet of rigid material having an exterior surface and an interior surface wherein the interior surface includes a plurality of inner supports formed as an extension of the continuous body, wherein plurality of inner supports are positioned on the interior of the continuous body near a first end of the continuous body such that the interior supports define a first interior diameter at the first end of the continuous body and the sheet defines a second interior diameter at a second end of the continuous body, and wherein the first interior diameter is less than the second interior diameter.

2. The pipe coupling support of claim 1, wherein the continuous body further comprises at least one notch in the body for receiving a protruding portion of the installed pipe coupling.

3. The pipe coupling support of claim 2, wherein the inner support is fabricated from a rigid material.

4. The pipe coupling support of claim 1 further comprising a compression portion adapted to receive a compression apparatus which can compress the body, wherein the compression portion comprises at least one of:
    one or more slots for receiving a hose clamp or pipe clamp;
    opposing flanges with opposing slots or apertures for receiving a bolt or other fastener.

5. A pipe coupling support for supporting an installed pipe coupling, the installed pipe coupling connecting a first pipe having a first exterior diameter and a second pipe having a second exterior diameter different from the first exterior diameter, the pipe coupling support comprising:
    a continuous body formed by a roughly cylindrically-shaped sheet of rigid material, the continuous body having:
        three or more inner supports, wherein the three or more inner supports are positioned on the interior of the continuous body near a first end of the continuous body creating a first opening having a first size determined by the three or more inner supports, the first opening operable to receive the first pipe with the first exterior diameter;
        a second opening having a second size such that the second opening is operable to receive the second portion of the installed pipe coupling when the second pipe with the second exterior diameter is inserted into the second opening of the pipe coupling support; and
        wherein the second opening is larger than the first opening thereby allowing the continuous body to be slipped over the pipe coupling after the pipe coupling has been installed on the first pipe and second pipe; and
    a compression apparatus.

6. The pipe coupling support of claim 5, wherein the compression apparatus comprises at least one of:
    one or more hose clamps and worm drives; and
    a bolt, slot and flange apparatus.

7. The pipe coupling support of claim 5, wherein the three or more inner supports are fabricated from one of:
    a pliable material; and
    a rigid material.

8. The pipe coupling support of claim 5, wherein the wherein the three or more inner supports are a separate structure from the continuous body.

9. The pipe coupling support of claim 5, wherein the three or more inner supports are formed as an extension of the continuous body.

10. The pipe coupling support of claim 5, wherein the continuous body further comprises a pliable inner member.

* * * * *